United States Patent
Veitsel et al.

(10) Patent No.: US 9,385,767 B2
(45) Date of Patent: Jul. 5, 2016

(54) APPARATUS FOR CORRECTING MULTIPATH ERRORS IN CARRIER PHASE MEASUREMENTS OF A NAVIGATION RECEIVER

(71) Applicants: Andrey Vladimirovich Veitsel, Moscow (RU); Vladimir Victorovich Beloglazov, Moscow (RU); Victor Abramovich Veitsel, Moscow (RU)

(72) Inventors: Andrey Vladimirovich Veitsel, Moscow (RU); Vladimir Victorovich Beloglazov, Moscow (RU); Victor Abramovich Veitsel, Moscow (RU)

(73) Assignee: Topcon Positioning Systems, Inc., Livermore, CA (US)

(*) Notice: Subject to any disclaimer, the term of this patent is extended or adjusted under 35 U.S.C. 154(b) by 110 days.

(21) Appl. No.: 14/356,249

(22) PCT Filed: Sep. 23, 2013

(86) PCT No.: PCT/RU2013/000825
§ 371 (c)(1),
(2) Date: May 5, 2014

(87) PCT Pub. No.: WO2014/193262
PCT Pub. Date: Dec. 4, 2014

(65) Prior Publication Data
US 2015/0358145 A1     Dec. 10, 2015

(30) Foreign Application Priority Data
May 28, 2013   (RU) ................................ 2013124391

(51) Int. Cl.
*H03D 3/24*  (2006.01)
*H04B 1/16*  (2006.01)
*H04L 27/148*  (2006.01)
*G01S 19/29*  (2010.01)

(52) U.S. Cl.
CPC . *H04B 1/16* (2013.01); *G01S 19/29* (2013.01); *H04L 27/148* (2013.01)

(58) Field of Classification Search
CPC ....... G01S 19/24; G01S 19/30; H04B 1/7085; H04B 2201/70715; H03L 2207/50; H03L 7/08
USPC ......................................................... 375/376
See application file for complete search history.

(56) References Cited

U.S. PATENT DOCUMENTS 6,272,189 B1     8/2001  Garin et al.
6,313,789 B1 *  11/2001  Zhodzishsky ........... G01S 19/29
                                                    342/357.68

(Continued)

FOREIGN PATENT DOCUMENTS

RU         2450446         10/2012

OTHER PUBLICATIONS

Search report in PCT/RU2013/000827, dated Jun. 26, 2014.

*Primary Examiner* — David S Huang
(74) *Attorney, Agent, or Firm* — Bardmesser Law Group (57) ABSTRACT

A correction phase locked loop (CPLL), including a signal processing unit that receives a digitized input signal from a satellite, the signal processing unit comprising (a) a primary correlator and primary discriminator, connected in series and generating a main error signal $Z_1$ from the digitized input signal; (b) a correction correlator and a correction discriminator connected in series and generating a correction signal $Z_2$; and (c) an adder for adding the main error signal $Z_1$ and the correction signal $Z_2$ to produce a common error signal Z. A loop filter filters the common error signal Z to produce a corrected error signal that is used for frequency-phase control of a Numerical Control Oscillator (NCO). The NCO generates two mutually orthogonal output reference signals whose phase is substantially free of multipath errors.

17 Claims, 5 Drawing Sheets

(56) References Cited

U.S. PATENT DOCUMENTS

| | | |
|---|---|---|
| 6,493,378 B1 | 12/2002 | Zhodzishsky et al. |
| 2006/0242445 A1* | 10/2006 | Aweya .................. H03L 7/08 713/400 |
| 2010/0253402 A1* | 10/2010 | Awata .................. G01S 19/29 327/156 |

* cited by examiner

APPARATUS FOR CORRECTING MULTIPATH ERRORS IN CARRIER PHASE MEASUREMENTS OF A NAVIGATION RECEIVER

BACKGROUND OF THE INVENTION

Multi-channel navigation receivers encoded by pseudo-random codes (PR-codes) are widely used together with global navigation satellite systems, such as GPS, GLN ("GLONASS") and some others. These GNSS systems are capable of determining a location of the receiver, determining its speed vector and coordinating the receiver clock scale with the system time. The navigation receiver receives signals from a few satellites at the same time. In GPS, each satellite transmits signals using two bands: L1 and L2. Within the L1 band, the carrier of the radio signal is modulated by the pseudo-random (PR) clear acquisition (C/A) code and a pseudo-random precision (P) code. In the L2 band the same P-code is used on a different carrier frequency. GPS satellite signals differ by PR-code structure. In the L1 band, the codes are inversely modulated by binary symbols containing information. The clock rate of the information symbols is 50 Hz.

Figure 1:
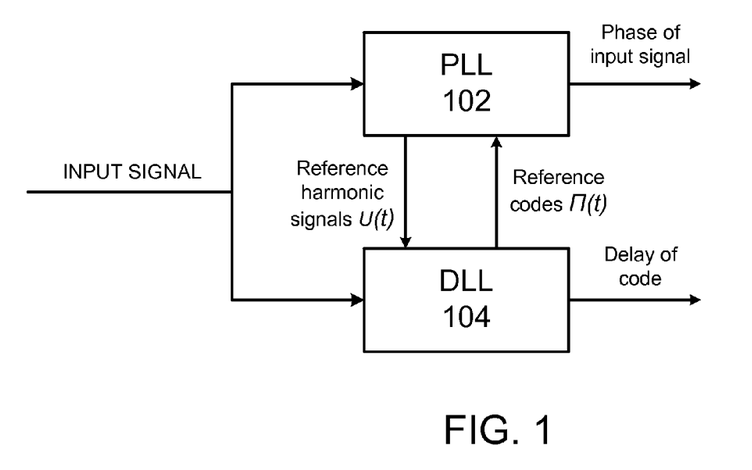
FIG. 1 shows interaction of a PLL and a DLL in a channel of a navigation receiver.

Similar principles are embodied in receivers of different GNSS, with some adjustments in code structure, carrier frequency, methods of dividing satellite channels, and so on There are coupled tracking systems in satellite channels of the navigation receiver: a phase lock loop (PLL) 102 to track carrier frequency and a delay lock loop (DLL) 104, used to track the modulating PR code. The DLL generates reference codes and measures time delays that are further transformed in pseudo-ranges. Carrier phases and pseudo-ranges are used for measuring phase and code coordinates respectively, as shown in FIG. 1.

Figure 2:
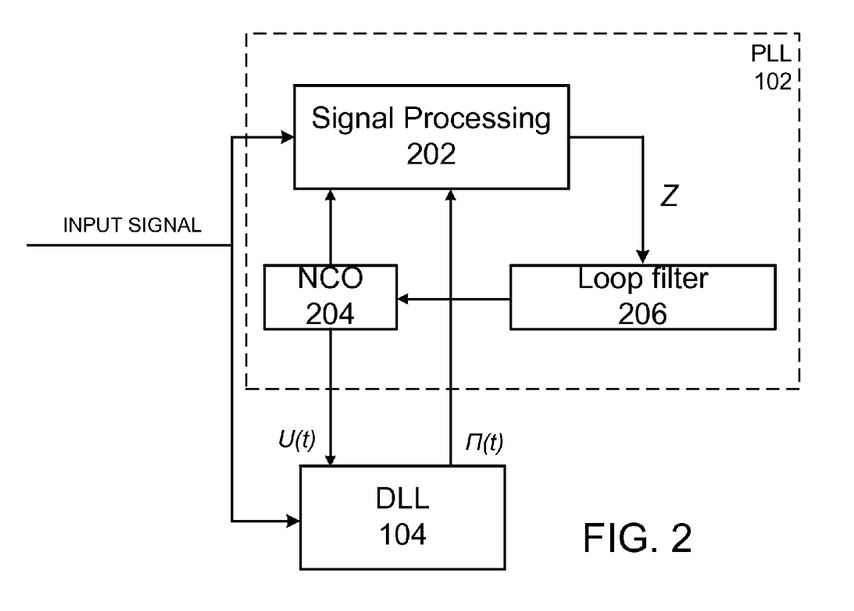
FIG. 2 is a block diagram of a typical PLL.

A typical tracking circuit is a cascade connection of single units through which control signals are transmitted. FIG. 2 shows a general structure of a PLL circuit. The DLL is built in a similar manner.

An input signal from a satellite is fed to the signal processing unit in PLL where it is processed with reference carriers and reference codes. A reference carrier u(t) is generated by a numerical control oscillator (NCO) 204, reference codes Π(t) come from the DLL. As a result of the processing, an error signal Z is generated which goes through the next unit (a loop filter 206) and is then fed to control the NCO, thereby closing the circuit.

Tracking systems in navigation receivers are implemented by digital devices, hence control signals in the loops are discretely transmitted at an interval which is called an adjustment period.

Processing in the signal processing units includes generating correlation signals. A correlation signal is a result of accumulating multiplication products of the received signal (passed through input and filtering units and frequency converter in the receiver) multiplied by a reference carrier and a reference code. The reference carrier corresponds to the carrier of the received signal for the given satellite, the reference code corresponds to the PR code of the same satellite. Units that multiply and accumulate are called reset correlators, and the corresponding process is called cross-correlation of two signals. A few reset correlators are assigned for each satellite different from each other in reference signals. Accumulation in digital correlators is implemented by adding digital samples which follow at a certain time interval called epoch.

Figure 3:
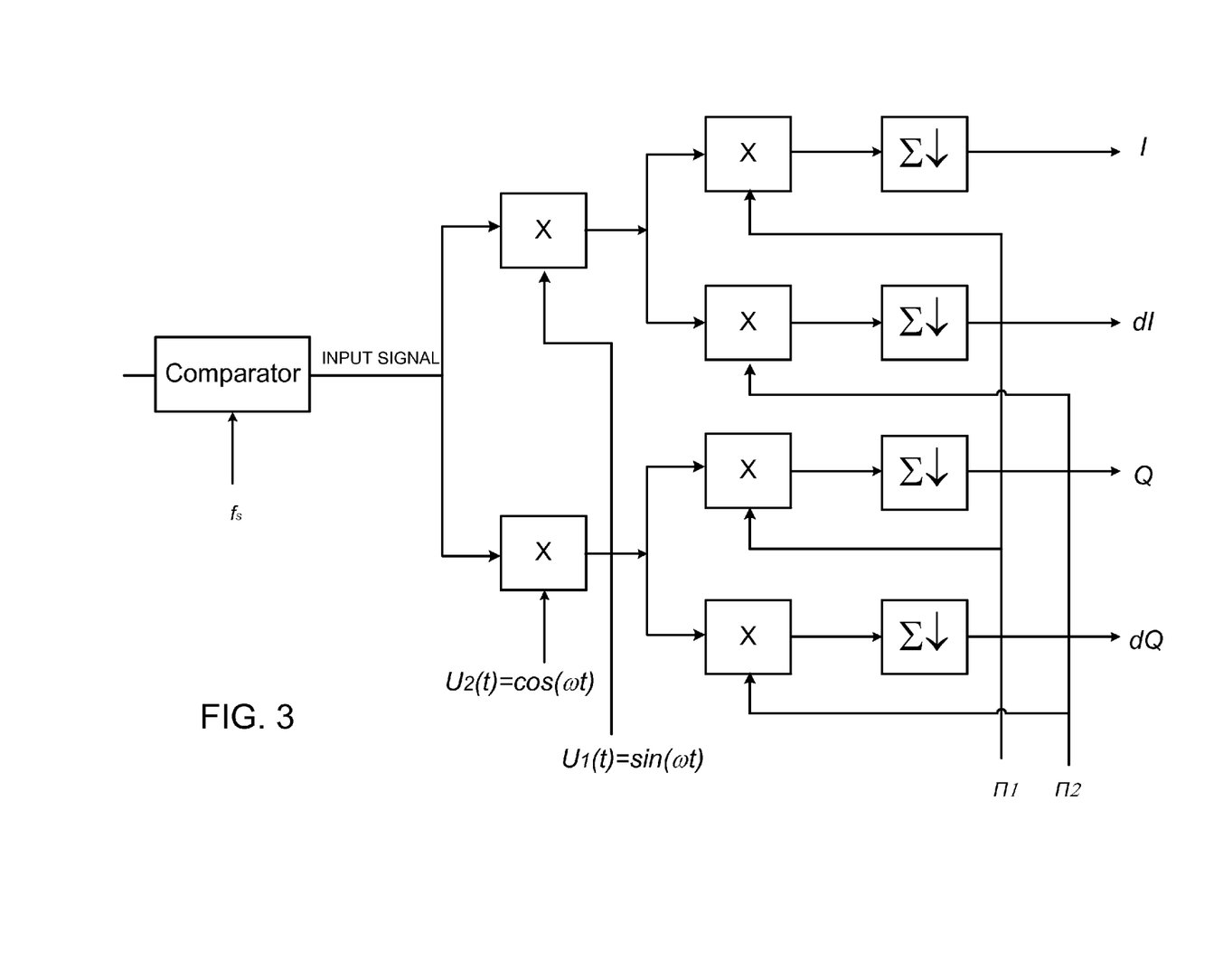
FIG. 3 illustrates generation of correlation signals.

There are many types of channel configuration for such a receiver. A typical configuration normally includes a few correlators. FIG. 3 shows a scheme of correlators, where there are multiplication operators (X) and reset accumulators $\Sigma\downarrow$.

The first correlator calculates an in-phase correlation signal I. This signal can be generated if the input signal is correlated with in-phase reference carrier $u_1(t)=\sin(\omega t)$, the phase of which corresponds to the carrier phase of the input signal and the first reference code Π1. In this correlator, the reference code is a PR-code replica modulating the input signal. Due to their correlation, the in-phase correlation signal I is generated, which is used to demodulate binary information symbols; in different units, this signal is used as an auxiliary normalization signal.

If there is an error during phase correction of the in-phase reference carrier phase co and error of time delay of the reference code $\epsilon$, then the signal I can be represented as:

$$I = \mu\kappa U_s R_0(\epsilon)\cos\phi, \quad (1)$$

where $R_0(\epsilon)$ is the cross-correlation function of PR code (passed the receiver filter) and the first reference code Π1, which is a locally-generated copy of the input PR code.

$\kappa U_s$ is the value proportional to the amplitude of the input signal.

μ—is the designation of the information binary symbols ($\mu=\pm 1$)

The second correlator calculates the quadrature correlation signal Q. This signal is generated when quadrature reference carrier $u_2(t)=\cos(wt)$ is present in the correlator, i.e., its phase is shifted by $\pi/2$ from the input carrier, and reference code Π1 is the same as in the first path. Their cross-correlation gives the quadrature correlation signal Q, which is used to generate the error signal in the PLL The signal Q is as follows:

$$Q = \mu\kappa U_s R_0(\epsilon)\sin\phi \quad (2)$$

The third path calculates a differential in-phase correlation signal dI intended for controlling the DLL. To generate this signal, the in-phase reference carrier $u_1(t)$ (that is in-phase with the input carrier) is employed, and reference code Π2 represent a sequence of short pulses—strobes—which are set at the moments of changing chip signs of the input PR-code. The polarity of the strobes matches the sign of the chip following the next strobe. Each strobe is generated in the form of a group of several rectangular-shaped pulses with different duration (in particular, a simple strobe shaped as a single rectangular pulse is used).

The dI signal is:

$$dI = \mu\kappa U_s \Delta R_0(\epsilon)\cos\phi, \quad (3)$$

where $\Delta R_0(\epsilon)$ is the cross-correlation function of the modulating PR-code (after the receiver filter) and the reference code consisting of a sequence of short strobes.

Some navigation receiver types have a fourth path where a differential quadrature correlation signal dQ is computed. (See, for example, *High-precision positioning apparatuses based on global navigation satellite system signals*, Vol. 1, Edited by Zhodzishsky M. I. Moscow, MAI-PRINT, 2010, page 230). To get this signal, quadrature reference carrier and reference code of strobes (as in the third path) are used, but pulse groups can be differently shaped depending on the purpose of the given correlation signal. As a result, the correlation signal dQ is given by $$dQ = \mu\kappa U_s \Delta R_1(\epsilon)\sin\phi \quad (4)$$

where $\Delta R_1(s)$ is different from $\Delta R_0(\epsilon)$ in strobe shapes and time positions in the reference code.

Time shifts of reference codes in the first, second, and fourth paths are tightly coupled with the adjusted DLL shift of the reference code for the third path.

In the signal processing units, correlation signals are converted into error signals, then filtered and used for controlling reference oscillators.

In real conditions, PLLs and DLLs measure phases and delays with errors caused by external disturbances: additive interference (including intrinsic noise of the receiver), fluctuations during radio wave propagation, instability of oscillator frequency etc, as well as dynamic disturbances due to receiver movement. Each external disturbance brings a certain type of errors and needs special measures to be suppressed. One of the most essential additive interference is signals reflected from the ground or local objects. The so-called multipath errors caused by reflected signals can substantially reduce accuracy of both code and carrier phase measurements.

A number of methods are applied to fighting against multipath errors in DLL and PLL. Those based on improving channel structures and not relating to any specific model of the reflected signal can be singled out. Methods of suppressing reflected signals described in U.S. Pat. No. 5,901,183, U.S. Pat. No. 5,953,367, U.S. Pat. No. 6,272,189 and U.S. Pat. No. 6,493,378 are based on applying different shapes of pulse grouping in strobes designed for reference codes.

Final accuracy of navigational measurements is defined by a combination of different disturbances. When one estimates a specific suppression technique for one interference type, he needs to consider a possibility of increasing errors of some other types. Different disturbances can be most dangerous for different scenarios and the consumer needs to choose a receiver or operation mode that is the best for coping with the most dangerous errors in a particular environment.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

The present invention improves operational quality of PLL tracking the input carrier phase when multipath errors affect accuracy of coordinate measurements. The proposed apparatus also considers intrinsic noise of the receiver. A diagram of the preferable PLL system implementing the main aspect of the invention is shown in FIG. 4.

A radio signal, including a number of satellite signals (each signal is a carrier modulated by PR code), is received by the antenna and processed by the receiver analog path with the limited bandwidth. This signal passes through an analog-digital converter and is fed to PLL and DLL circuits of each satellite channel as input signal (401) in digital form.

Figure 4:
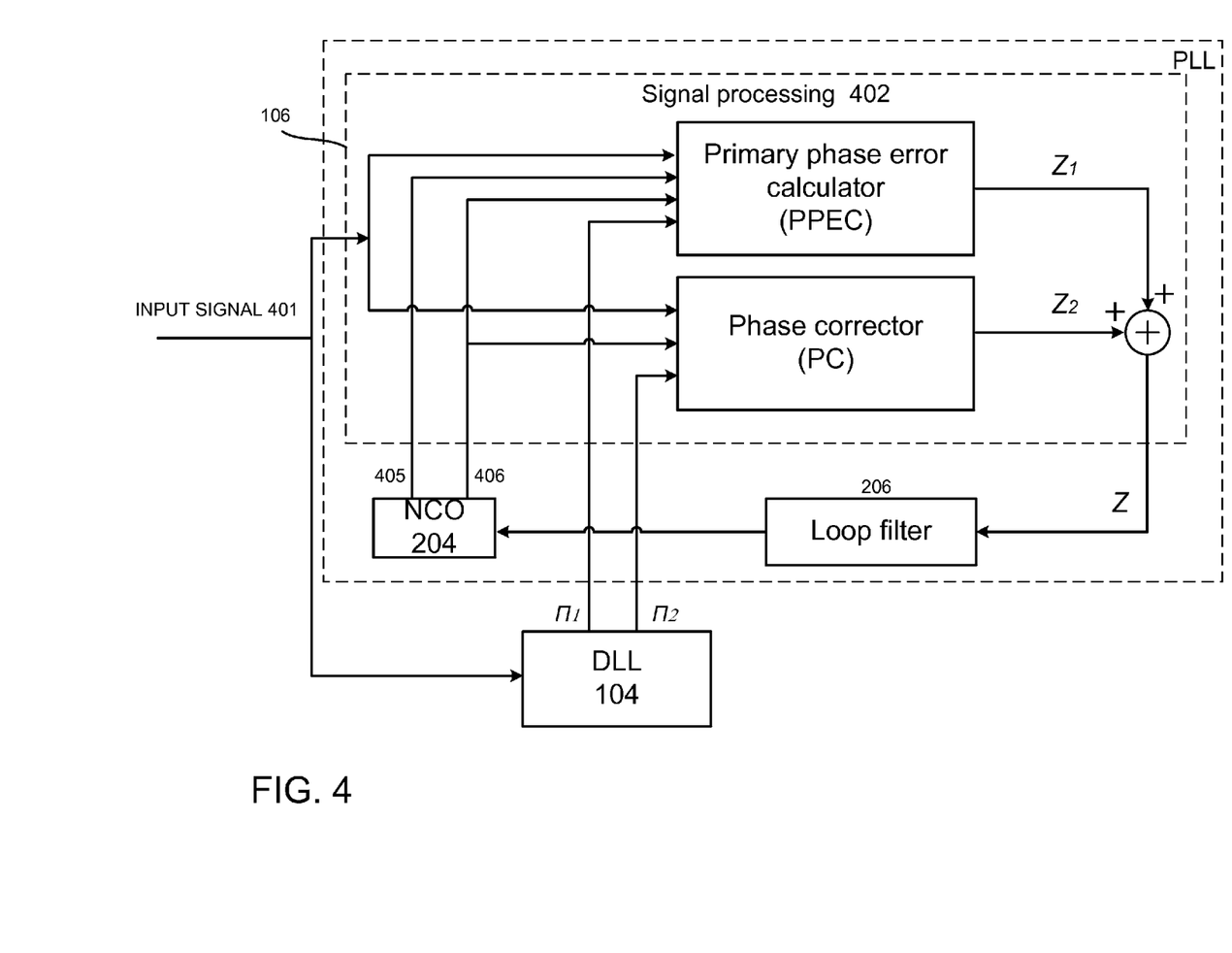
FIG. 4 shows a block diagram of a signal processing unit in a PLL.

In the PLL circuit (which is shown in FIG. 4 in more detail) the input signal (401) is fed to a signal processing unit, where error signal Z is generated. The error signal passes through a Loop filter (411), and controls an NCO where in-phase (405) and quadrature (406) reference carriers are generated. Third-order loop filter is recommended in PLL to provide frequency-phase control of NCO. The method of frequency-phase NCO control is generally known (see, for example, *High-precision positioning apparatuses based on global navigation satellite system signals*, Vol. 1, Edited by Zhodzishsky M. I. Moscow, MAI-PRINT, 2010, page 97).

Both reference carriers are transmitted to the signal processing unit, closing the PLL circuit. Reference codes $\Pi1$ and $\Pi2$ generated in DLL are also fed to the signal processing unit.

The circuit structure above is typical for PLLs of a navigation receiver if the signal processing unit performs only main operations—generating correlation signals Q and I and outputting error signal $Z=\arctan(Q/I)$. But in this case, the phase of the reference carriers is distorted by the reflected signal.

FIG. 4 shows a proposed more complex structure of the Signal processing unit that includes two parallel circuits: Primary phase error calculator (PPEC) and Phase corrector (PC). Outputs of both circuits are added and the newly generated error signal Z, providing suppression of the delayed reflected signal, if the signal lag exceeds the duration of the transition process in changing PR-code symbols.

Figure 5:
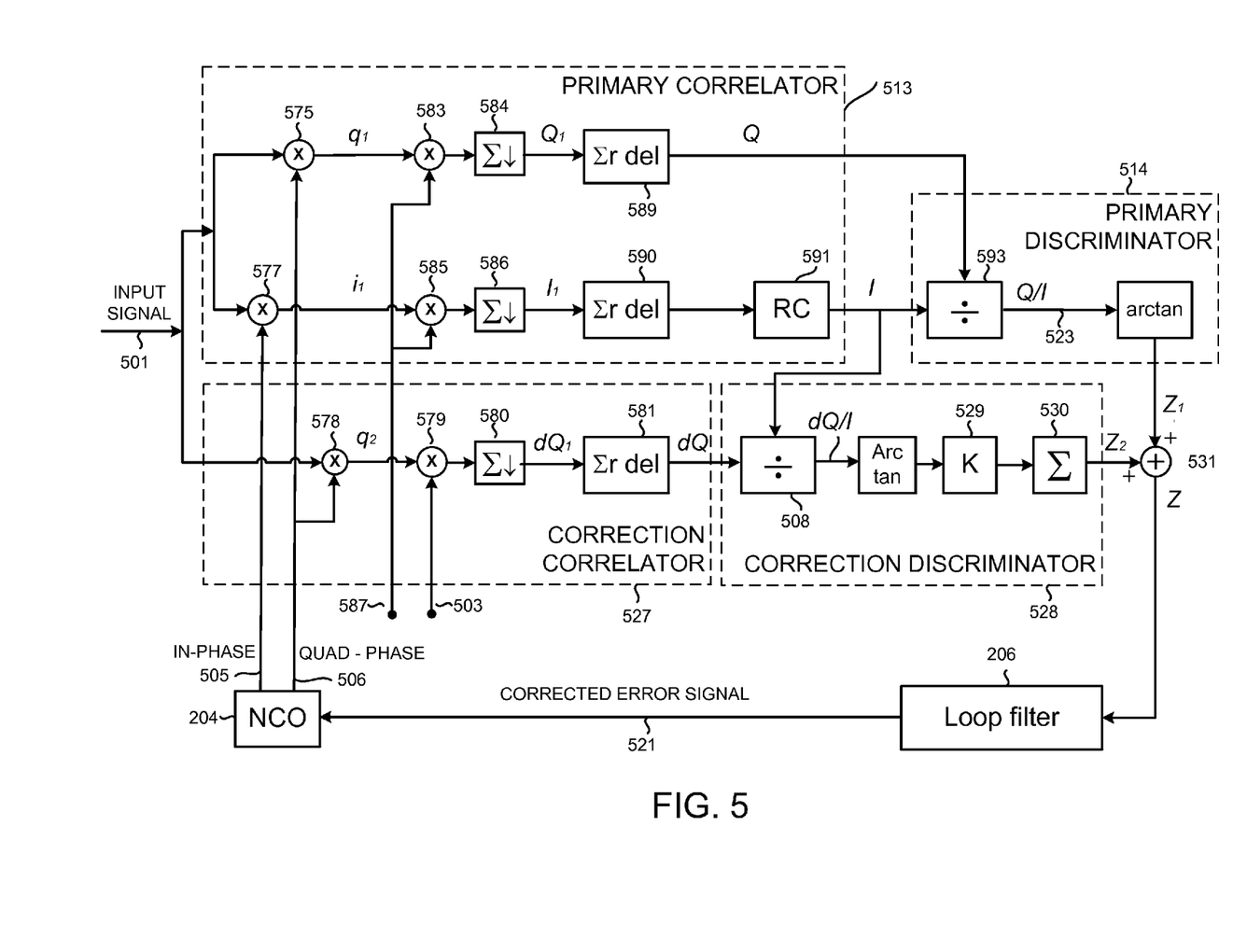
FIG. 5 is a block diagram of a PLL capable of correcting multipath errors.

Referring to FIG. 5 that shows PPEC and PC structures in more details, each circuit includes two units connected in series. The PPEC contains a PRIMARY CORRELATOR (PC) (513) and a PRIMARY DISCRIMINATOR (514). The PC includes a CORRECTION CORRELATOR (527) and a CORRECTION DISCRIMINATOR (528).

The outputs of both circuits ($Z_1$ and $Z_2$) are added (see 531) and form a common error signal Z, which passes through the loop filter (511), and is further fed to the NCO (507) as corrected error signal (521). The oscillator (507) generates the first—in-phase (505)—and the second—orthogonal (506)—reference carriers, which are fed to units (513) and (527) closing PLL circuit. The correlation signals I and Q are generated in unit (513).

Generation of quadrature correlation signal (Q) in the PRIMARY CORRELATOR unit (513) starts from two typical correlation stages: multiplication of the input signal by quadrature reference carrier 506 (operation 575) and a first reference code 587 (operation 583). Then, multiplication results are averaged in the reset accumulator (operation 584). Averaging time in these correlators is comparatively small (typical value is one epoch).

Generation of the in-phase correlation signal I includes similar operations (operations 577 and 585), but at the first stage correlation is implemented with the in-phase reference carrier (505), and at the second stage—with the first reference code 587 (operation 585). The results are averaged in the reset accumulator (operation 586).

FIG. 6 shows graphs of relationships for PR-code of the input signal and reference codes. The graph in FIG. 6(A) illustrates a sequence of chips with different symbol signs in PR-code of the input signal (solid lines). The duration of one chip is designated as symbol A. The transition process (Front) lasts for time F at changing the sign and is conditionally shown with a sloping straight line. The reflected signal PR-code is shown as a dotted line (it is similar to the PR-code of the direct signal but smaller in amplitude and has a delay 6). The graph of the first reference code is given in FIG. 6(C).

Chips in the reference code remain rectangular, their duration and sign correspond to that of the line-of-sight signal. Delay (8) of the reference code shows DLL tracking error relative to the line-of-sight signal.

Referring to FIG. 5, the next unit—the PRIMARY DISCRIMINATOR (514)—executes non-linear operations which in noisy environments result in energy losses. Of particular concern are big fluctuations in component I, since it is in the denominator of division operation (593) in the primary discriminator unit (514). For this reason, the signal-to-noise ratio should preferably be increased before the non-linear operation and hence smoothing (averaging) I needs to also be increased in the primary correlator unit.

Signals of navigation satellites in the L1 band are modulated by information symbols ($\mu$), which can change sign every 20 ms. Therefore, before smoothing, the signs of the information symbols need to be removed. This removal operation cannot be limited to the signal I only, and should be done for all correlation signals, so as not to affect the sign of the error signal in the tracking systems. FIG. 5 conditionally shows the operation of removing the sign in a unit designated $\Sigma_r$del (589, 590, 581). This designation emphasizes that deletion of inverse modulation by symbols occurs along with further averaging over the adjustment period. Similar operations are well known and described in the technical literature (see, for instance, High precision positioning apparatuses based on global navigation satellite system signals, Vol. 1, Edited by Zhodzishsky M. I. Moscow, MAI-PRINT, 2010, page 170).

After the sign has been deleted, smoothing time for I can be increase in tens of times, since it does not measurably affect the inertial of the tracking circuit. In FIG. 5, additional smoothing is designated as RC (591).

Next, the PRIMARY DISCRIMINATOR unit (514) starts from division operation (593), then another non-linear operation follows arctan(Q/I) which forms a linear part of the discriminator curve in a typical PLL. Main error signal $Z_1$ is generated at the output of unit (514).

A PC circuit, which is designed for correcting error signal to suppress reflected signals effects, is added to a conventional typical PLL (see FIG. 4). This element also contains two units: a CORRECTION CORRELATOR (527) and a CORRECTION DISCRIMINATOR (528) (see FIG. 5).

The correction correlator unit generates the differential quadrature correlation signal dQ. In this case quadrature reference carrier (506) and strobe reference code (503) are used. After multiplication operations 578 and 579 are completed, the obtained result is accumulated in the reset accumulator (operation 580), inverse modulation by symbols is deleted, and further averaging is produced over the adjustment period (operation 581).

According to a first embodiment of the invention a simple, single rectangular-shaped, strobe is used in a reference code (503) (similar to the differential in-phase correlation signal dI). A distinguishing feature of this embodiment, unlike correlator dI, is to set strobes (503) symmetrically relative to the origin of each PR-code chip at all moments—not only at changing chip polarity but also at moments when there is no change in sign. The polarity of the pulse corresponds to the sign of next chip.

Figure 6A:
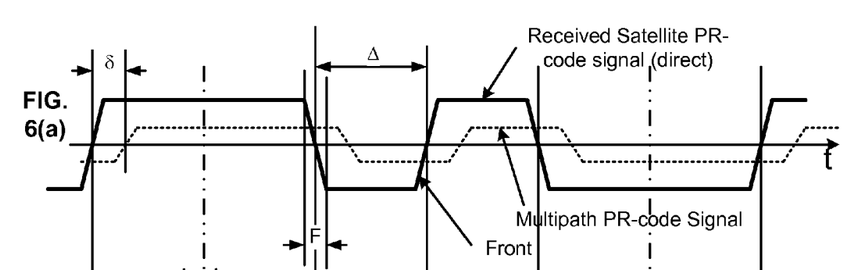
FIG. 6 shows time diagrams of reference codes.
Figure 6B:
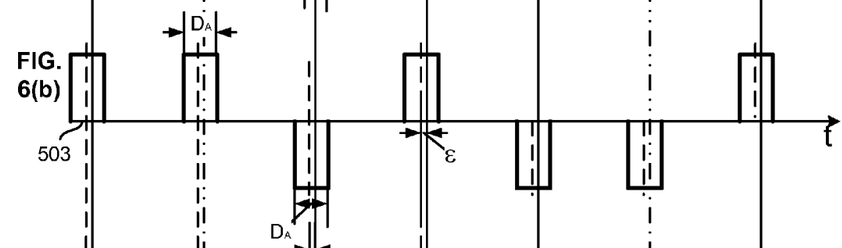
Figure 6C:
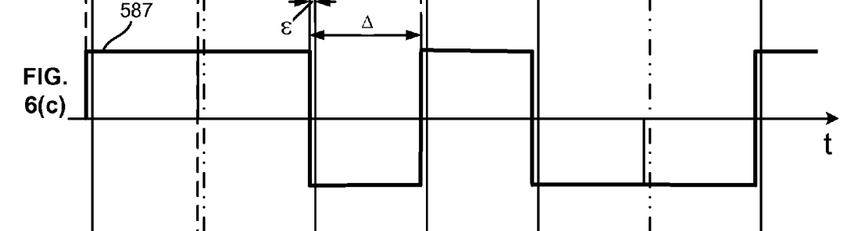
Figure 6D:
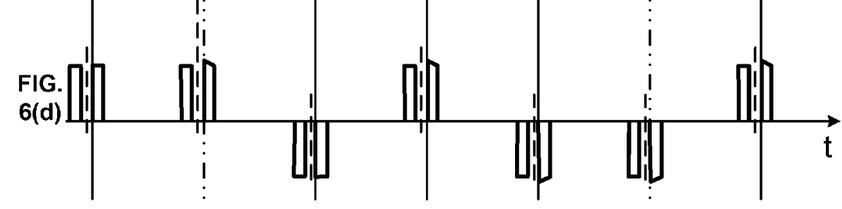

Timing diagrams showing shapes and location of strobes in reference code (503) are given in FIG. 6(B). The pulse duration of strobe $D_A$ is less than $\Delta$ and is approximately the same as value F.

The second embodiment of the invention uses a strobe in the form of a pair of rectangular pulses of the same polarity with a gap between them. The pulses are located symmetrically relative to the origin of each RP-code chip. FIG. 6(B) illustrates the first aspect of the invention, and FIG. 6(D)—the second one. The variable $\epsilon$ represents DLL tracking error.

The proposed structures of the reference code considerably affect the cross-correlation function between modulating PR-code and reference code, making the function $\Delta R_1(\epsilon)$ much different from function $\Delta R_0(\epsilon)$ (see expressions (3) and (4)).

Operator (581) in the correction correlator unit (FIG. 5) deletes the sign of the information symbol, and the obtained differential correlation signal dQ is fed to correction discriminator 528. In this unit, in division operator (508), the in-phase correlation signal I generated in the primary correlator unit (513) is applied. Then, non-linear operations arctan(dQ/I), similar to unit (514), are performed.

To obtain the correction $Z_2$, two operators 529 and 530 are used. In operator 529, multiplication by a transfer coefficient K is produced, and value K×arctan(dQ/I) is fed to digital accumulator 530 (in analog circuits, a time integrator performs the same operation). The resulting correction $Z_2$ is added to the main error signal $Z_1$ in adder 531, thereby generating a common error signal Z.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A correction phase locked loop (CPLL), comprising:
 a signal processing unit that receives a digitized input signal from a satellite, the signal processing unit comprising
 (a) a primary correlator and primary discriminator, connected in series and generating a main error signal $Z_1$ from a quadrature component Q and an in-phase component I of the digitized input signal;
 (b) a correction correlator and a correction discriminator connected in series, wherein the correction discriminator receives the in-phase component I from the primary correlator and generates a correction signal $Z_2$ based on the in-phase component I; and
 (c) an adder that adds the main error signal $Z_1$ and the correction signal $Z_2$ to produce a common error signal Z;
 a loop filter filtering the common error signal Z to produce a corrected error signal that is used for frequency-phase control of a Numerical Control Oscillator (NCO),
 wherein the NCO generates two mutually orthogonal components of a reference signal whose phase is substantially free of multipath errors, and
 wherein the primary discriminator performs the following operations on the quadrature component Q and the in-phase component I in sequence:
 (i) a division Q/I, and
 (ii) an arctangent Atan(Q/I)
 to generate the main error signal $Z_1$; and
 wherein the correction discriminator unit performs the following operations on a differential quadrature correlation signal dQ and I in sequence:
 (i) a division dQ/I,
 (ii) arctangent Atan(dQ/I),
 (iii) a multiplication by a transfer coefficient K, and
 (iv) a digital integration
 to generate the correction signal $Z_2$.

2. The CPLL of claim 1, wherein the two mutually orthogonal components include a quadrature component of the reference signal and an in-phase component of the reference signal, and wherein the primary correlator generates a signal $q_1$ by multiplying the digitized input signal by the quadrature component of the reference signal, and generates a signal $i_1$ by multiplying the digitized input signal by the in-phase component of the reference signal; and wherein the correction correlator generates a signal $q_2$ by multiplying the digitized input signal by the quadrature component of the reference signal.

3. The CPLL of claim 1, wherein the primary correlator deletes a sign for inverse modulation by information symbols in signals $Q_1$ and $I_1$ to generate the quadrature component Q and the in-phase component I, wherein the sign deletion includes accumulating the signals $Q_1$ and $I_1$ for an adjustment period of the CPLL, wherein the in-phase component I is additionally smoothed over a time exceeding chip duration in the PR-code modulating the digitized input signal; and wherein the correction correlator includes one operation of sign deletion for inverse modulation in a signal $dQ_1$ to generate a differential quadrature correlation signal dQ;

wherein the sign deletion includes accumulating the signal $dQ_1$ over the adjustment period.

4. The CPLL of claim 3 wherein the in-phase component I is smoothed by a digital first order filter with a noise bandwidth of about 5-7 Hz.

5. The CPLL of claim 3, wherein the adjustment period of the CPLL lasts about 5 ms.

6. The CPLL of claim 1, wherein the transfer coefficient K is selected in a range of 0.3-0.4.

7. A correction phase locked loop (CPLL), comprising:
a signal processing unit that receives a digitized input signal from a satellite, the signal processing unit comprising
(a) a primary correlator and primary discriminator, connected in series and generating a main error signal $Z_1$ from the digitized input signal;
(b) a correction correlator and a correction discriminator connected in series and generating a correction signal $Z_2$; and
(c) an adder that adds the main error signal $Z_1$ and the correction signal $Z_2$ to produce a common error signal Z;
a loop filter filtering the common error signal Z to produce a corrected error signal that is used for frequency-phase control of a Numerical Control Oscillator (NCO),
wherein the NCO generates two mutually orthogonal output reference signals whose phase is substantially free of multipath errors,
wherein the primary correlator generates a signal $I_1$ by correlating a signal it with a reference code that is a pseudo-random-code (PR-code) replica modulating the digitized input signal;
wherein the primary correlator generates a signal $Q_1$ by correlating a signal $q_1$ with the reference code that is a PR-code replica;
wherein the correction correlator generates a signal $dQ_1$ by correlating a signal $q_2$ with a reference code of strobes, each strobe presenting a single rectangular pulse setting symmetrically relative to the origin of each PR-code chip;
wherein the correlations are averaged over one epoch; and
wherein time position of the strobes is controlled by a delay locked loop.

8. The CPLL of claim 7, wherein the epoch has a duration of 1 ms.

9. The CPLL of claim 7, wherein the single rectangular pulse in the reference C/A-code has a duration of 60-70 ns, a center of the pulse being set at a zero point of transition of PR-code symbols with different polarity, as well as at original points of symbols whose polarity matches a previous symbol.

10. The CPLL of claim 9, wherein a sign of the single rectangular pulse matches a sign of a symbol following the single rectangular pulse.

11. The CPLL of claim 7,
wherein a result of multiplying the signal it and the reference code is accumulated in a first reset accumulator;
wherein a result of multiplying the signal $q_1$ and the reference code is accumulated in a second reset accumulator;
wherein a result of multiplying the signal $q_2$ and the reference code of strobes is accumulated in a third reset accumulator.

12. A correction phase locked loop (CPLL), comprising:
a signal processing unit that receives a digitized input signal from a satellite, the signal processing unit comprising
(a) a primary correlator and primary discriminator, connected in series and generating a main error signal $Z_1$ from a quadrature component Q and an in-phase component I of the digitized input signal, wherein the in-phase component I is sign-deleted and smoothed;
(b) a correction correlator and a correction discriminator connected in series and generating a correction signal $Z_2$;
(c) an adder that adds the main error signal $Z_1$ and the correction signal $Z_2$ to produce a common error signal Z; and
a loop filter filtering the common error signal Z to produce a corrected error signal that is used for frequency-phase control of a Numerical Control Oscillator (NCO),
wherein the NCO generates two mutually orthogonal components of a reference signal whose phase is substantially free of multipath errors.

13. The CPLL of claim 12, wherein the in-phase component I is sign-deleted and smoothed in the primary correlator.

14. A correction phase locked loop (CPLL), comprising:
a signal processing unit that receives a digitized input signal from a satellite, the signal processing unit comprising
(a) a primary correlator and primary discriminator, connected in series and generating a main error signal $Z_1$ from a quadrature component Q and an in-phase component I of the digitized input signal, wherein the main error signal $Z_1$ is calculated as Atan(Q/I);
(b) a correction correlator and a correction discriminator connected in series and generating a correction signal $Z_2$;
(c) an adder that adds the main error signal $Z_1$ and the correction signal $Z_2$ to produce a common error signal Z; and
a loop filter filtering the common error signal Z to produce a corrected error signal that is used for frequency-phase control of a Numerical Control Oscillator (NCO),
wherein the NCO generates two mutually orthogonal components of a reference signal whose phase is substantially free of multipath errors, and
wherein the correction correlator correlates a signal $q_2$ with a reference code that includes strobes, each strobe being a pair of rectangular pulses of the same polarity with a gap between the pulses, that is symmetrical relative to the origin of each pseudo-random-code chip.

15. The CPLL of claim 4, wherein a strobe comprising a pair of rectangular pulses of the same amplitude and polarity is set symmetrically relative to original points, a total duration of the strobe is 60-70 ns, and the interval between pulses is 30-40 ns.

16. The CPLL of claim 15, wherein a sign of the pair of rectangular pulses matches a sign of a symbol following the pair of rectangular pulses.

17. A correction phase locked loop (CPLL), comprising:
a signal processing unit that receives a digitized input signal from a satellite, the signal processing unit comprising
(a) a primary correlator and primary discriminator, connected in series and generating a main error signal $Z_1$ from the digitized input signal;
(b) a correction correlator that uses only a single correlator internally and a correction discriminator connected in series and generating a correction signal $Z_2$;
(c) an adder that adds the main error signal $Z_1$ and the correction signal $Z_2$ to produce a common error signal Z; and
a loop filter filtering the common error signal Z to produce a corrected error signal that is used for frequency-phase control of a Numerical Control Oscillator (NCO),
wherein the NCO generates two mutually orthogonal components of a reference signal whose phase is substantially free of multipath errors.

* * * * *